US008722237B2

United States Patent
Guen

(10) Patent No.: US 8,722,237 B2
(45) Date of Patent: May 13, 2014

(54) SECONDARY BATTERY

(75) Inventor: Minhyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 281 days.

(21) Appl. No.: 13/172,758

(22) Filed: Jun. 29, 2011

(65) Prior Publication Data

US 2012/0251874 A1  Oct. 4, 2012

Related U.S. Application Data

(60) Provisional application No. 61/469,033, filed on Mar. 29, 2011.

(51) Int. Cl.
*H01M 2/02* (2006.01)
*H01M 2/26* (2006.01)
*H01M 2/30* (2006.01)
*H01M 2/20* (2006.01)
*H01M 10/04* (2006.01)

(52) U.S. Cl.
CPC .............. *H01M 2/263* (2013.01); *H01M 2/266* (2013.01); *H01M 2/30* (2013.01); *H01M 2/20* (2013.01); *H01M 2/0217* (2013.01); *H01M 10/045* (2013.01); *Y02E 60/12* (2013.01)
USPC ........... 429/178; 429/121; 429/122; 429/161; 429/170; 429/179

(58) Field of Classification Search
CPC ........ Y02E 60/12; H01M 2/263; H01M 2/30; H01M 2/20; H01M 2/266; H01M 10/045; H01M 2/0217; H01M 10/16
USPC ................. 429/121, 122, 161, 170, 178, 186
See application file for complete search history.

(56) References Cited

U.S. PATENT DOCUMENTS

2004/0191612 A1  9/2004  Akita et al.
2005/0042508 A1*  2/2005  Kim et al. ..................... 429/174
(Continued)

FOREIGN PATENT DOCUMENTS

EP  2 244 328 A2  10/2010
JP  11-339757  12/1999
(Continued)

OTHER PUBLICATIONS

Extended Euopean Search Report dated Jun. 22, 2012 for EP 11179864.1 (5 pages).
(Continued)

*Primary Examiner* — Patrick Ryan
*Assistant Examiner* — Ben Lewis
(74) *Attorney, Agent, or Firm* — Christie, Parker & Hale, LLP

(57) ABSTRACT

A secondary battery including: an electrode assembly; a case containing the electrode assembly; a cap plate sealing an opening of the case; an electrode terminal protruding outside the case; and a collector electrically connected between the electrode assembly and the electrode terminal, wherein the collector includes a first collecting part coupled to the electrode terminal and including a first coupling portion, and a second collecting part coupled to the electrode assembly and including a second coupling portion, the first coupling portion being coupled to the second coupling portion, and wherein one of the first and second coupling portions includes a protrusion part, and the other of the first and second coupling portions includes an accommodation part, the protrusion part being received in the accommodation part.

20 Claims, 13 Drawing Sheets

(56) References Cited

U.S. PATENT DOCUMENTS

| | | |
|---|---|---|
| 2006/0024578 A1 | 2/2006 | Lee |
| 2007/0009793 A1* | 1/2007 | Kim et al. .................. 429/175 |
| 2007/0202364 A1* | 8/2007 | Uh et al. ....................... 429/7 |
| 2008/0038627 A1 | 2/2008 | Yamauchi et al. |
| 2010/0297484 A1 | 11/2010 | Kim |
| 2011/0244314 A1 | 10/2011 | Lee et al. |
| 2012/0088138 A1* | 4/2012 | Munenaga et al. ........... 429/94 |

FOREIGN PATENT DOCUMENTS

| | | | |
|---|---|---|---|
| JP | 2003-346770 | | 12/2003 |
| JP | 2005-142026 | | 6/2005 |
| JP | 2005-267945 | A | 9/2005 |
| JP | 2010-272513 | | 12/2010 |
| KR | 10-0599709 | B1 | 7/2006 |
| KR | 10-2011-0127621 | | 11/2011 |
| WO | WO 2010/147136 | * 12/2010 | ............ H01M 2/26 |
| WO | WO 2010/147136 | A1 | 12/2010 |

OTHER PUBLICATIONS

JPO Office action dated Jun. 4, 2013, for corresponding Japanese Patent application 2011-207232, (4 pages).

Patent Abstracts of Japan, and English machine translation of Japanese Publication 2003-346770, dated Dec. 5, 2003, (14 pages).

KIPO Notice of Allowance dated Jun. 19, 2013, for corresponding Korean Patent application 10-2011-0083990, (5 pages).

Korean Patent Abstracts of Korean Publication 1020060010482, dated Feb. 2, 2006, corresponding to Korean Patent 10-0599709 dated Jul. 12, 2006, listed above, (2 pages).

* cited by examiner

SECONDARY BATTERY

CROSS-REFERENCE TO RELATED APPLICATION

This application claims the benefit of U.S. Provisional Application No. 61/469,033, filed on Mar. 29, 2011 in the United States Patent and Trademark Office, the entire content of which is incorporated herein by reference.

BACKGROUND

1. Field

Aspects of embodiments of the present invention relate to a secondary battery.

2. Description of the Related Art

Secondary batteries are rechargeable unlike primary batteries. Among such secondary batteries, a low capacity battery including a battery cell in the form of a pack may be used for small portable electronic devices such as cellular phones and camcorders, and a high capacity battery including dozens of battery cells connected to one another may be used as a motor-driving power source for electric scooters, hybrid vehicles, or electric vehicles.

Secondary batteries are manufactured in various shapes, such as a cylindrical shape and a prismatic shape. A secondary battery may be constructed as follows: an electrode assembly formed by disposing an insulating separator between positive and negative electrode plates is placed in a case together with electrolyte; and a cap plate is disposed on the case. The electrode assembly is connected to positive and negative terminals which protrude from the cap plate and are exposed to the exterior of the secondary battery.

SUMMARY

According to an aspect of embodiments of the present invention, a secondary battery includes a detachable collector for easily performing an assembling process and improving manufacturing processes.

According to another aspect of embodiments of the present invention, a secondary battery is easily repairable.

According to an embodiment of the present invention, a secondary battery includes: an electrode assembly; a case containing the electrode assembly; a cap plate sealing an opening of the case; an electrode terminal protruding outside the case; and a collector electrically connected between the electrode assembly and the electrode terminal, wherein the collector includes a first collecting part coupled to the electrode terminal and including a first coupling portion, and a second collecting part coupled to the electrode assembly and including a second coupling portion, the first coupling portion being coupled to the second coupling portion, and wherein one of the first and second coupling portions includes a protrusion part, and the other of the first and second coupling portions includes an accommodation part, the protrusion part being received in the accommodation part.

In one embodiment, the first coupling portion includes the protrusion part, and the second coupling portion includes the accommodation part. The first collecting part may further include a head part extending in a direction substantially perpendicular to the protrusion part, the head part being fixed to the electrode terminal and the cap plate. A first width of the protrusion part at a first region distal from the head part may be less than a second width of the protrusion part at a second region proximate the head part.

The protrusion part may include a body portion and a hook part extending from the body portion, the hook part being fixed in contact against a surface of the accommodation part.

In one embodiment, the protrusion part includes a body portion and a protrusion extending from the body portion, the protrusion being fixed in an opening of the accommodation part. The opening may be formed in a wall of the accommodation part, and the wall may have a slit formed therethrough adjacent the opening.

In one embodiment, the second collecting part further includes a branch part extending from the accommodation part and being fixed to the electrode assembly. The protrusion part may include a body portion and a hook part extending from the body portion, the hook part being fixed in a groove of the branch part.

In one embodiment, the secondary battery further includes another electrode assembly, and the second collecting part further includes another branch part extending from the accommodation part and being fixed to the another electrode assembly.

The first coupling portion may be detachably coupled to the second coupling portion.

The electrode assembly may include a non-coating portion, and the collector may be electrically connected between the non-coating portion and the electrode terminal. In one embodiment, the non-coating portion includes a first non-coating portion arranged at a first end of the electrode assembly, and the electrode assembly further includes a second non-coating portion arranged at a second end of the electrode assembly opposite the first end; the electrode terminal includes a first electrode terminal, and the collector includes a first collector; and the secondary battery further includes a second electrode terminal protruding outside the case, and a second collector electrically connected between the second non-coating portion and the second electrode terminal.

The cap plate and the first and second electrode terminals may be detachably coupled to the second collecting parts of the first and second collectors together with the first collecting parts of the first and second collectors. In one embodiment, the first collecting parts of the first and second collectors are fixed to the cap plate, and the second collecting parts of the first and second collectors are fixed to the first and second non-coating portions, respectively.

According to another embodiment of the present invention, a collector for electrically connecting an electrode assembly and an electrode terminal of a secondary battery includes: a first collecting part coupleable to the electrode terminal and including a first coupling portion; and a second collecting part coupleable to the electrode assembly and including a second coupling portion, the first coupling portion being coupleable to the second coupling portion, and one of the first and second coupling portions includes a protrusion part, and the other of the first and second coupling portions includes an accommodation part, the protrusion part being slidably receivable in the accommodation part.

The protrusion part may include a body portion and a hook part extending from the body portion, the hook part being fixed in contact against a surface of the accommodation part. The protrusion part may include a body portion and a protrusion extending from the body portion, the protrusion being fixed in an opening of the accommodation part. The first coupling portion may be detachably coupleable to the second coupling portion.

According to another embodiment of the present invention, a secondary battery includes: an electrode assembly; a case containing the electrode assembly; a cap plate sealing an opening of the case; an electrode terminal protruding outside the case; and a collector electrically connected between the electrode assembly and the electrode terminal, and the collector includes a first collecting part coupled to the electrode terminal and including a first coupling portion, and a second collecting part coupled to the electrode assembly and including a second coupling portion, the first coupling portion being detachably coupled to the second coupling portion.

According to another embodiment of the present invention, a secondary battery includes: an electrode assembly; a case configured to accommodate the electrode assembly; a collector electrically connected to the electrode assembly; a cap plate configured to close the case so as to seal the electrode assembly, the case, and the collector; and an electrode terminal electrically connected to the collector and inserted through the cap plate, wherein the collector includes: a first collecting part coupled to the electrode terminal and including a coupling protrusion part; and a second collecting part coupled to the electrode assembly and including a coupling part to which the coupling protrusion part is coupled.

According to an aspect of embodiments of the present invention, since the collector includes the first and second collecting parts detachably coupled together, and the first collecting part being detachably coupled to the collector, riveting or welding processes are not necessary for coupling the collector and the electrode terminal. Therefore, due to the detachable collector, the cap plate can be easily coupled to the secondary battery, and thus the manufacturing process of the secondary battery can be improved.

In addition, according to another aspect of embodiments of the secondary battery of the present invention, a defective part can be easily selected and repaired since the first and second collecting parts are assembled in two steps.

BRIEF DESCRIPTION OF THE DRAWINGS

The above and other features and advantages will become more apparent to those of ordinary skill in the art by describing in detail some exemplary embodiments of the present invention with reference to the attached drawings.

DESCRIPTION OF REFERENCE NUMERALS INDICATING SOME ELEMENTS IN THE DRAWINGS

| | |
|---|---|
| 100: secondary battery | 110: electrode assembly |
| 120: case | 130: first terminal |
| 131: first collector | 132, 142: first collecting part |
| 133, 143: second collecting part | 134: first non-coating portion |
| 135: first electrode terminal | 140: second terminal |
| 141: second collector | 144: second non-coating portion |
| 145: second electrode terminal | 150: cap plate |

DETAILED DESCRIPTION

Some exemplary embodiments of the present invention will now be described with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention.

Figure 1A:
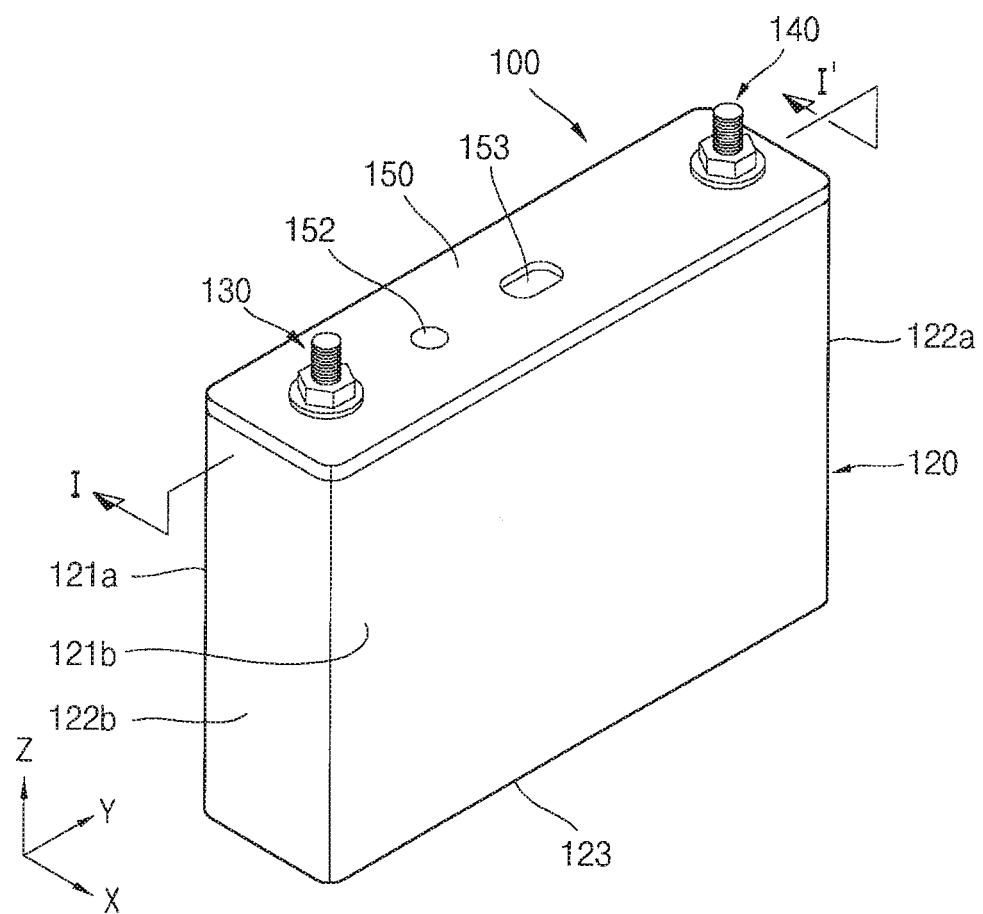
FIG. 1A is a perspective view of a secondary battery according to an embodiment of the present invention.
Figure 1B:
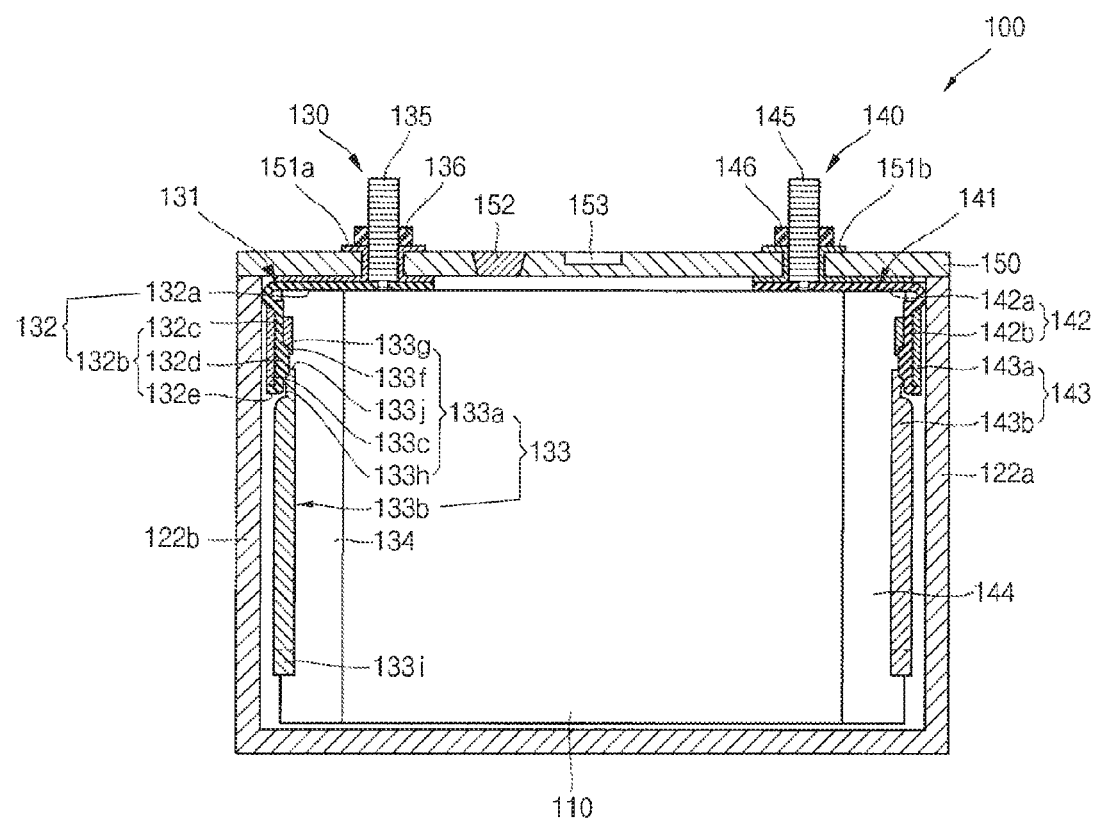
FIG. 1B is a sectional view of the secondary battery of FIG. 1A, taken along the line I-I'.
Figure 1C:
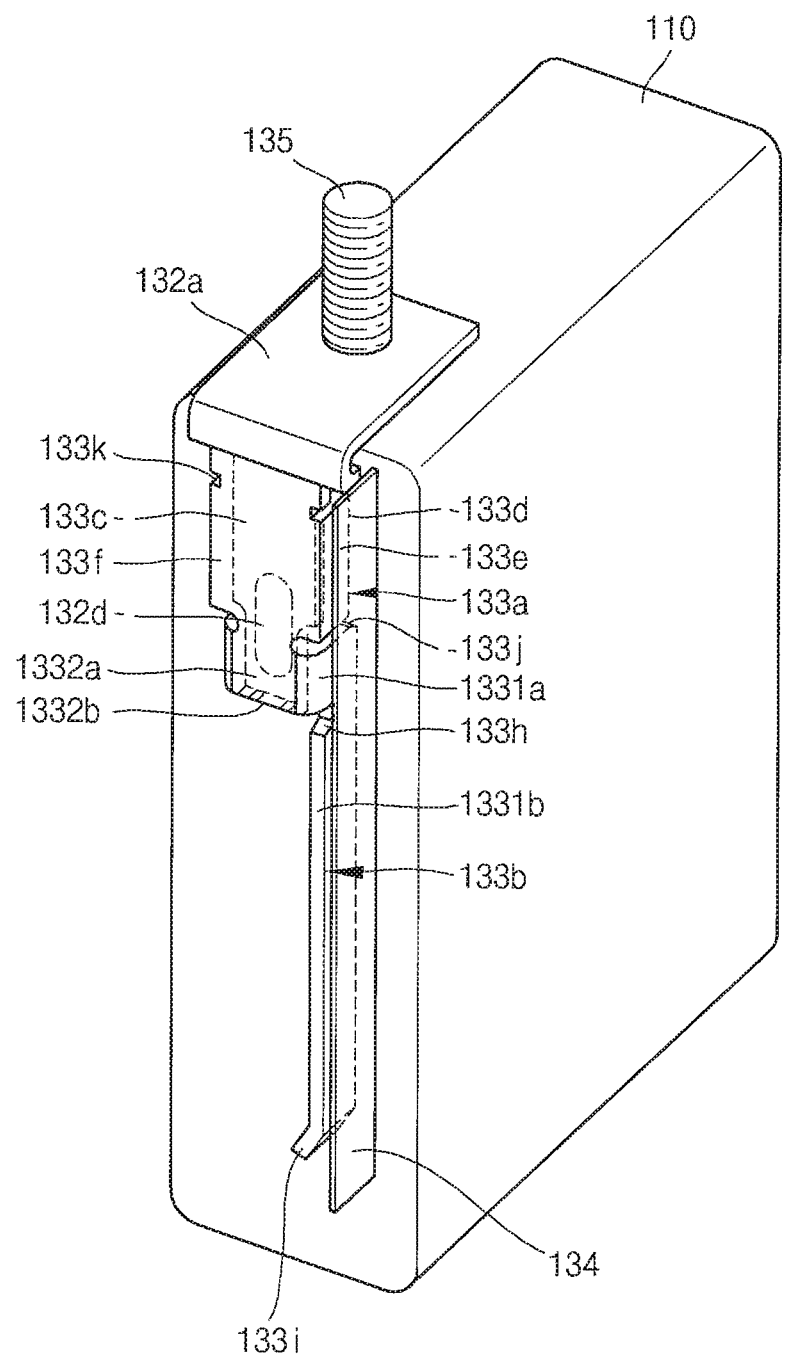
FIG. 1C is a perspective view of an electrode assembly and an electrode terminal of the secondary battery of FIG. 1A.
Figure 2A:
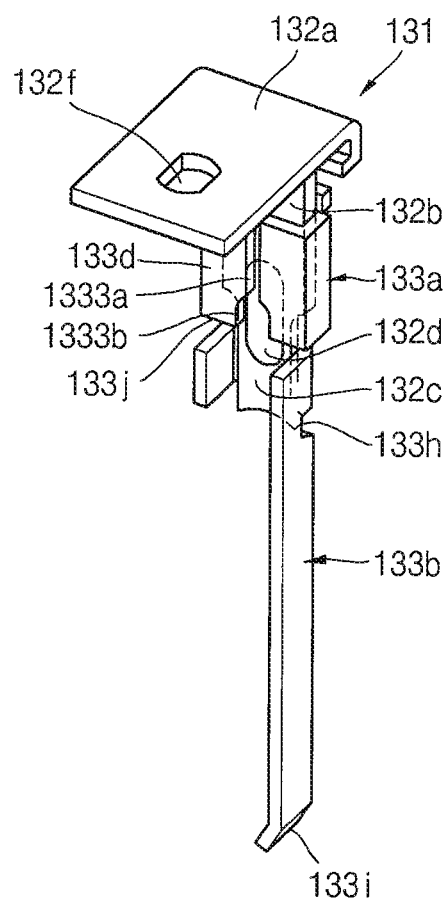
FIG. 2A is a perspective view of a collector of the secondary battery of FIG. 1A shown in an assembled state.
Figure 2B:
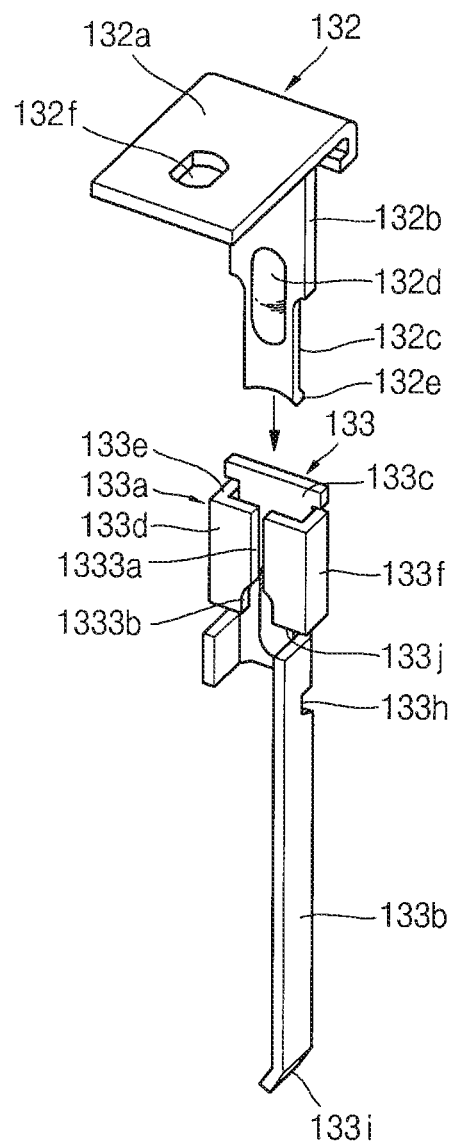
FIG. 2B is a perspective view of the collector of FIG. 2A shown in a disassembled state.

FIG. 1A is a perspective view of a secondary battery 100 according to an embodiment of the present invention; FIG. 18 is a sectional view of the secondary battery 100 taken along the line of I-I' FIG. 1A; and FIG. 1C is a perspective view of an electrode assembly and an electrode terminal of the secondary battery 100 illustrated in FIG. 1B. FIG. 2A is a perspective view of a first collector 131 of the secondary battery 100 according to an embodiment of the present invention, shown in an assembled state; and FIG. 2B is a perspective view of the first collector 131 shown in a disassembled state.

Referring to FIGS. 1A to 2B, the secondary battery 100 according to an embodiment of the present invention includes an electrode assembly 110, a case 120, a first terminal 130, a second terminal 140, and a cap plate 150.

The electrode assembly 110 may be formed by winding or stacking a first electrode plate, a separator, and a second electrode plate, which have a thin plate or film shape. For example, the electrode assembly 110 may have a jelly roll-type wound shape. The first electrode plate may be a positive electrode plate, and the second electrode plate may be a negative electrode plate. Alternatively, the first electrode plate may be a negative electrode plate, and the second electrode plate may be a positive electrode plate. The first electrode plate includes a first metal foil and a first active material. If the first electrode plate is a positive electrode plate, the first metal foil may be an aluminum foil, and the first active material may be a lithium-containing oxide. The second electrode plate includes a second metal foil and a second active material. If the second electrode plate is a negative electrode plate, the second metal foil may be a copper foil, and the second active material may be graphite. However, embodiments of the present invention are not limited to the above-described materials. The separator may be formed of porous polyethylene (PE), polypropylene (PP), or an equivalent thereof. However, the separator according to embodiments of the present invention is not limited to the above materials.

The separator may be disposed between the first electrode plate and the second electrode plate to prevent or substantially prevent a short circuit and allow movement of lithium ions. The separator, in one embodiment, may be formed of a polyethylene film, a polypropylene film, or a film including polyethylene and polypropylene. In embodiments of the present invention, materials which may be used to form the separator are not limited to the above-listed materials.

The electrode assembly 110 is accommodated in the case 120 together with electrolyte. The electrolyte may include an organic solvent such as ethylene carbonate (EC), propylene carbonate (PC), diethyl carbonate (DEC), ethyl methyl carbonate (EMC), or dimethyl carbonate (DMC); and a lithium salt such as lithium hexafluorophosphate (LiPF6) or lithium tetrafluoroborate (LiBF4). The electrolyte may be liquid, solid, or gel.

The first and second terminals 130 and 140 are coupled to the electrode assembly 110 in a manner such that the first and second terminals 130 and 140 are electrically connected to the first and second electrode plates, respectively. In one embodiment, the first and second terminals 130 and 140 are coupled to both end parts of the electrode assembly 110 in a manner such that the first and second terminals 130 and 140 are connected to a first non-coating portion 134 of the first electrode plate and a second non-coating portion 144 of the second electrode plate.

The case 120, in one embodiment, includes two wide lateral sides 121a and 121b, two narrow lateral sides 122a and 122b, and a bottom side 123. In addition, a top side of the case 120 may be open. The electrode assembly 110 is accommodated in the case 120 together with the electrolyte. In one embodiment, the first and second non-coating portions 134 and 144 of the electrode assembly 110 face the narrow lateral sides 122a and 122b. The case 120 may be formed of aluminum, copper, iron, stainless steel (e.g., SUS), ceramic material, polymer, or an equivalent thereof. However, embodiments of the present invention are not limited to such materials. In one embodiment, the case 120 may be electrically connected to one of the first and second electrode plates of the electrode assembly 110. That is, the case 120 may have a positive or negative polarity.

The first terminal 130 may be formed of a metal or an equivalent thereof and is electrically connected to the first electrode plate. The first terminal 130, in one embodiment, includes a first collector 131, a first electrode terminal 135, and a first coupling terminal 136.

The first collector 131 includes a first collecting part 132 and a second collecting part 133.

The first collecting part 132, in one embodiment, is coupled to the first electrode terminal 135 and includes a coupling protrusion part 132b. The first collecting part 132 is coupled to the second collecting part 133 through the coupling protrusion part 132b.

The first collecting part 132 includes a head part 132a and the coupling protrusion part 132b.

The head part 132a, in one embodiment, has a plate shape. According to one embodiment, one side of the head part 132a is connected to the first electrode terminal 135, and the other side of the head part 132a is welded to the coupling protrusion part 132b. The head part 132a, in one embodiment, includes a terminal hole 132f, and the first electrode terminal 135 is inserted through the terminal hole 132f and the cap plate 150 (described later) and protrudes from the cap plate 150 by a predetermined length. The other side of the head part 132a (i.e. a side opposite the terminal hole 132f), in one embodiment, is bent downward. Due to the head part 132a, the case 120 sealing the first collector 131 can be spaced apart from the second collecting part 133 coupled to the first collecting part 132 to prevent or substantially prevent the case 120 and the second collecting part 133 from making contact with each other. In addition, the head part 132a improves coupling strength with the second collecting part 133. In addition, the first collecting part 132 and the second collecting part 133 can be easily assembled and disassembled by using the head part 132a.

The coupling protrusion part 132b extends from an end portion of the other side of the head part 132a and is bent downward. The coupling protrusion part 132b, in one embodiment, includes a body part 132c, a protrusion part 132d, and a hook part 132e for coupling with the second collecting part 133 (described later). The protrusion part 132d protrudes from a center portion of the body part 132c toward the electrode assembly 110. The protrusion part 132d is coupled to the second collecting part 133 in a state where the protrusion part 132d makes contact with walls of a protrusion hole 1333b (described later) of the second collecting part 133.

Figure 5A:
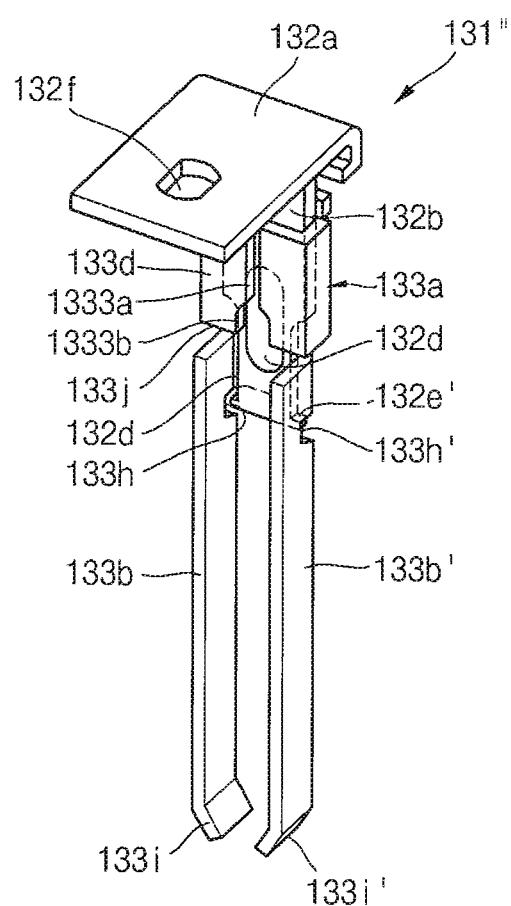
FIG. 5A is a perspective view of a collector of a secondary battery according to another embodiment of the present invention shown in an assembled state.
Figure 5B:
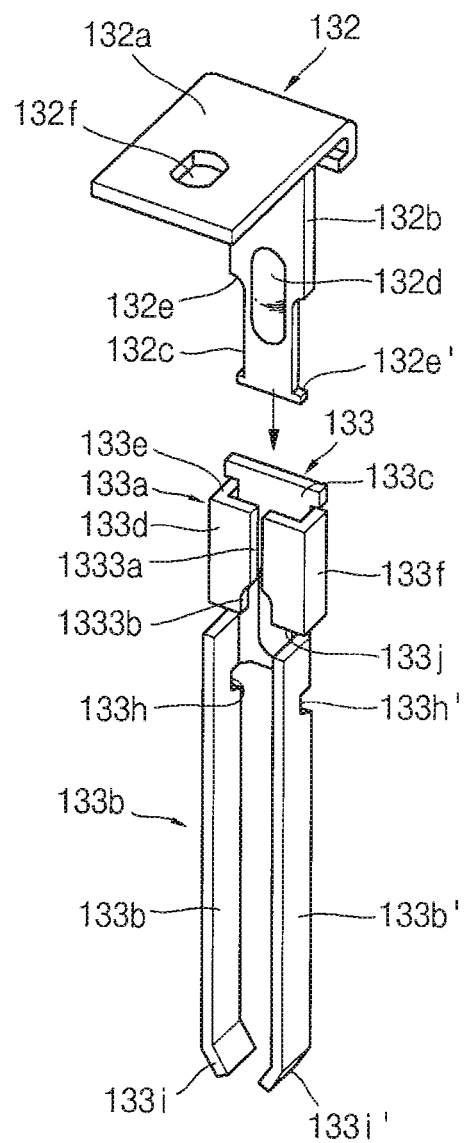
FIG. 5B is a perspective view of the collector of FIG. 5A shown in a disassembled state.

The hook part 132e, in one embodiment, extends from a lower end of the body part 132c and is bent away from the electrode assembly 110. Alternatively, as shown in FIGS. 5A and 5B, a hook part 132e' according to another embodiment of the present invention extends from the lower end of the body part 132c of the coupling protrusion part 132b and is bent in a direction perpendicular to the first non-coating portion 134 of the electrode assembly 110. Therefore, the hook part 132e of the first collecting part 132 can be securely coupled to and fixed to an accommodation part 133a of the second collecting part 133, and the coupling between the hook part 132e and the second collecting part 133 may be securely coupled and not broken although the secondary battery 100 is impacted. Alternatively, in another embodiment (not shown), the second collecting part 133 may include a protrusion part similar to the protrusion part 132b and the first collecting part 132 may include an accommodation part similar to the accommodation part 133a for receiving the protrusion part.

In one embodiment, a region of the coupling protrusion part 132b distal from the head part 132a (e.g., a region below a center portion of the protrusion part 132d) is narrower than a region of the coupling protrusion part 132b proximate the head part 132a (e.g., a region above the center portion of the protrusion part 132d). Due to this structure, the coupling protrusion part 132b may be easily slid into and coupled to the second collecting part 133 from the lower end of the coupling protrusion part 132b.

The second collecting part 133 includes the accommodation part 133a and a branch part 133b.

The accommodation part 133a, in one embodiment, includes an outer wall part 133c, an inner wall part 133d, and left and right wall parts 133e and 133f connected between the outer wall part 133c and the inner wall part 133d. In one embodiment, the upper end of the outer wall part 133c is higher than the upper end of the inner wall part 133d so that the upper end of the outer wall part 133c may make contact with a lower surface of the head part 132a. In one embodiment, a vertical slit 1333a is formed through the inner wall part 133d, and the protrusion hole 1333b having a shape corresponding to the protrusion part 132d of the first collecting part 132 is formed under the slit 1333a. For example, the protrusion part 132d of the first collecting part 132 may have an elliptical shape, and the shape of the protrusion hole 1333b may be correspondingly elliptical. Therefore, when the first collecting part 132 and the second collecting part 133 are coupled to each other, the protrusion part 132d is securely inserted in the protrusion hole 1333b. The outer wall part 133c of the accommodation part 133a includes a first extension part 1332a at a lower side. The first extension part 1332a, in one embodiment, is narrower than the outer wall part 133c. A catch jaw 1332b is formed at a lower end of the first extension part 1332a. In one embodiment, when the first collecting part 132 and the second collecting part 133 are coupled to each other, the hook part 132e of the first collecting part 132 is fixed as being brought into contact with the catch jaw 1332b. In one embodiment, the width between inner surfaces of the left and right wall parts 133e and 133f is approximately equal to the width of the coupling protrusion part 132b of the first collecting part 132 so that the coupling protrusion part 132b of the first collecting part 132 can be securely fixed to the accommodation part 133a of the second collecting part 133. In one embodiment, a first groove 133j is formed between the branch part 133b (described later) and the left and right wall parts 133e and 133f of the accommodation part 133a.

The branch part 133b, in one embodiment, may be welded to the first non-coating portion 134. The branch part 133b may extend downward from the accommodation part 133a. The branch part 133b may be welded to the first non-coating portion 134 so that the branch part 133b is electrically connected to a first electrode of the electrode assembly 110 through the first non-coating portion 134. The branch part 133b, in one embodiment, includes a second extension part 1331a and a first pillar part 1331b (see FIG. 1C). The second extension part 1331a extends from the left or right end of the first extension part 1332a and is bent toward the electrode assembly 110. The first pillar part 1331b extends downward from the second extension part 1331a. A second groove 133h, in one embodiment, is formed in an outer side of the first pillar part 1331b facing the case 120. In one embodiment, as shown in FIG. 5A, the hook part 132e' of the first collecting part 132 is brought into contact with the second groove 133h and is fixed to the second groove 133h. In one embodiment, the hook part 132e' extends from the lower end of the coupling protrusion part 132b in a direction perpendicular to the first non-coating portion 134 of the electrode assembly 110.

Figure 3A:
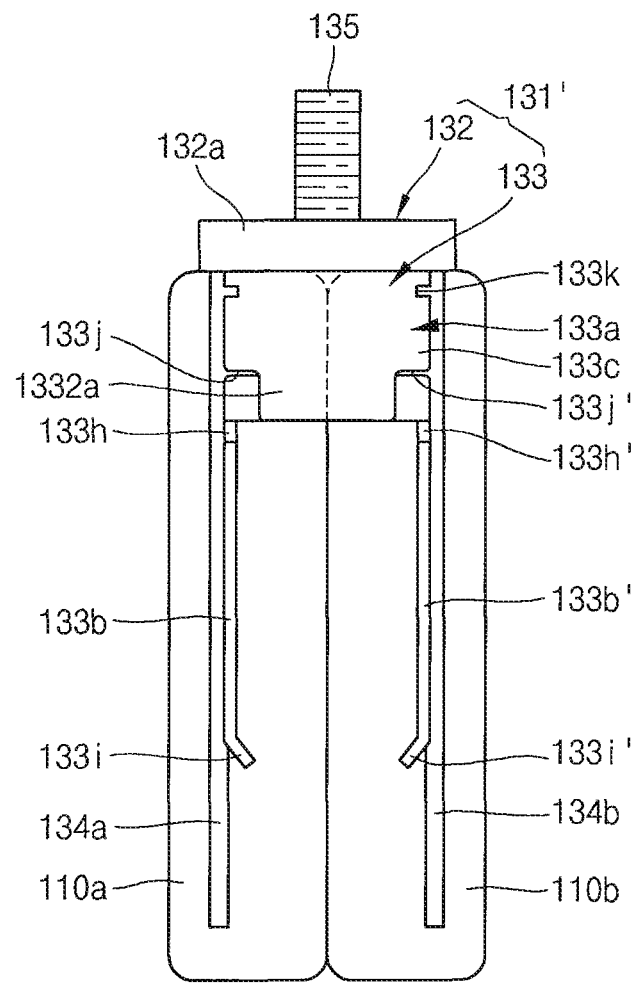
FIG. 3A is a side view of electrode assemblies and an electrode terminal of a secondary battery according to another embodiment of the present invention.
Figure 3B:
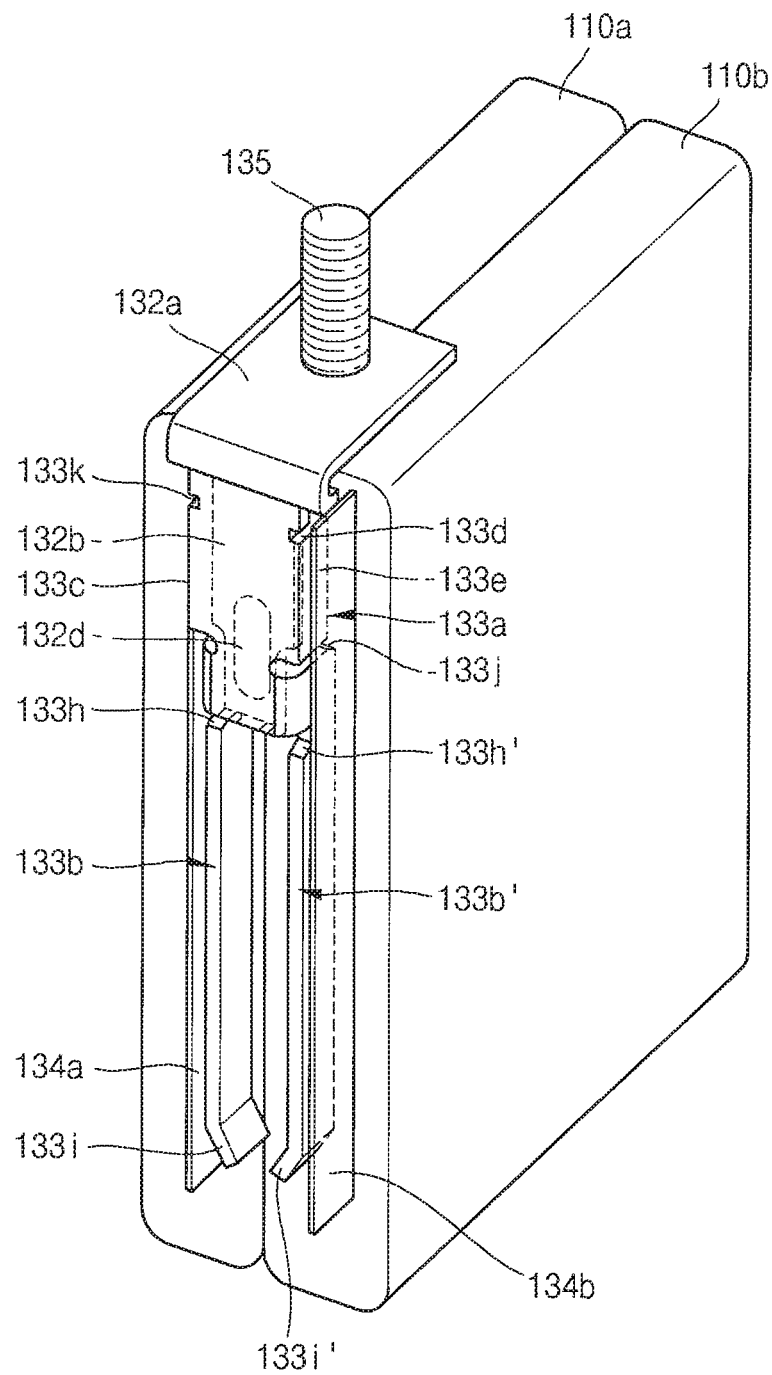
FIG. 3B is a perspective view of the electrode assemblies and the electrode terminal of FIG. 3A.

The branch part 133b extends from the left or right end of the first extension part 1332a. However, in an embodiment of the secondary battery including two electrode assemblies, as shown in FIGS. 3A and 3B, two branch parts 133b may extend from the left and right ends of the first extension part 1332a.

Therefore, the first collecting part 132 and the second collecting part 133 can be securely coupled to each other by fixing the protrusion part 132d of the first collecting part 132 to the protrusion hole 1333b of the second collecting part 133, and fixing the hook part 132e of the first collecting part 132 to the catch jaw 1332b of the second collecting part 133.

In one embodiment, a sloped part 133i is formed at a lower end of the branch part 133b. The sloped part 133i is bent and extends from the lower end of the branch part 133b in a direction away from the first non-coating portion 134. If the secondary battery 100 includes a pair of electrode assemblies, branch parts 133b may extend from the left and right sides of the first extension part 1332a, and sloped parts 133i may be bent and extend from the lower ends of the branch parts 133b to face each other.

The second terminal 140 may be formed of a metal or an equivalent thereof and is electrically connected to the second electrode plate. The second terminal 140, in one embodiment, includes a second collector 141, a second electrode terminal 145, and a second coupling terminal 146.

The second collector 141 according to an embodiment of the present invention is similar to the first collector 131 and includes a first collecting part 142 and a second collecting part 143.

In one embodiment, the first collecting part 142 includes a head part 142a and a coupling protrusion part 142b, and the second collecting part 143 includes an accommodation part 143a and a branch part 143b. The first collecting part 142 and the second collecting part 143 may have the same or similar structures as the first collecting part 132 and the second collecting part 133 of the first collector 131. Thus, descriptions of the same structures will not be repeated.

The cap plate 150 covers the case 120 in a manner such that the first and second electrode terminals 135 and 145 protrude outward. The cap plate 150 may be welded to the case 120 by a laser welding method or another suitable method. The first and second electrode terminals 135 and 145 may be threaded and inserted through the cap plate 150, and insulators 151a and 151b may be disposed around the first and second electrode terminals 135 and 145, respectively, so that, in one embodiment, the first and second electrode terminals 135 and 145 are electrically insulated from the cap plate 150. Alternatively, in another embodiment, one of the first and second electrode terminals 135 and 145 may not be provided with the insulator 151a or 151b. That is, in one embodiment, one of the first and second electrode terminals 135 and 145 may be inserted through the cap plate 150 in contact with the cap plate 150. For example, the first electrode terminal 135 may not be surrounded by the insulator 151a and may be in direct contact with the cap plate 150. In this case, the cap plate 150 and the case 120 have the same polarity as that of the first electrode terminal 135.

In one embodiment, the first and second coupling terminals 136 and 146 may be respectively coupled to the first and second electrode terminals 135 and 145 by a bolt-nut coupling method. Therefore, the first and second electrode terminals 135 and 145 can be securely fixed to the cap plate 150. In one embodiment, an electrolyte plug 152 may be coupled to the cap plate 150, and a safety vent 153 may be formed on the cap plate 150 in a manner such that the safety vent 153 is thinner than other regions of the cap plate 150. The cap plate 150, in one embodiment, may be formed of substantially the same material as that used to form the case 120.

FIG. 3A is a side view of electrode assemblies and an electrode terminal of a secondary battery according to another embodiment of the present invention, and FIG. 3B is a perspective view of the electrode assemblies and the electrode terminal of FIG. 3A As shown in FIGS. 3A and 3B, a secondary battery according to an embodiment of the present invention may include a pair of electrode assemblies 110a and 110b. The first collecting part 132 of a first collector 131 is electrically connected to the electrode terminal 135, and the second collecting part 133 is coupled to the first collecting part 132 for electrically connecting both electrode assemblies 110a and 110b to the electrode terminal 135. Branch parts 133b and 133b' of the second collecting part 133 may be inserted between non-coating portions 134a and 134b of the respective electrode assemblies 110a and 110b.

As described above, the first and second collecting parts 132 and 133 of the first collector 131 are detachably coupled to each other, such that the first collecting part 132 is detachably coupled to the pair of electrode assemblies 110a and 110b. Therefore, although the capacity of the secondary battery increases, a cap plate can be easily attached without having to couple the collector and the terminal by riveting or welding. Therefore, the manufacturing process of the secondary battery can be improved.

Figure 4A:
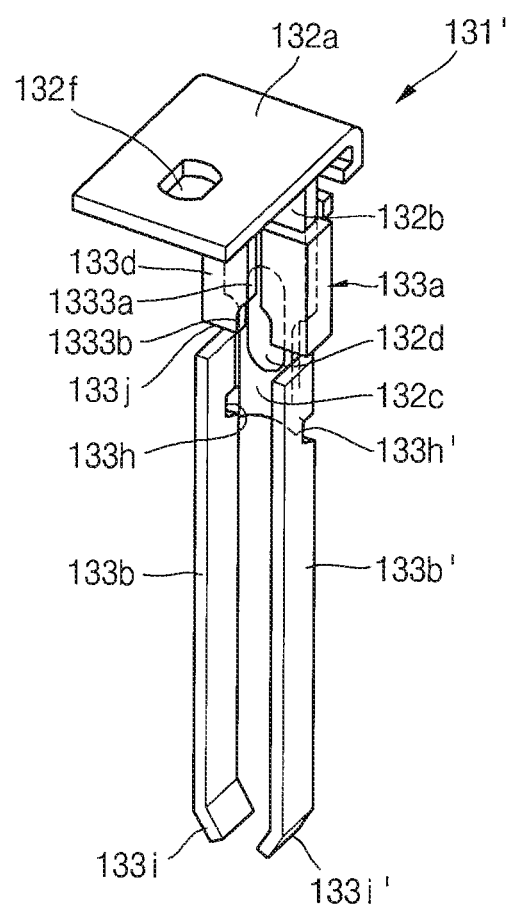
FIG. 4A is a perspective view of a collector of a secondary battery according to an embodiment of the present invention shown in an assembled state.
Figure 4B:
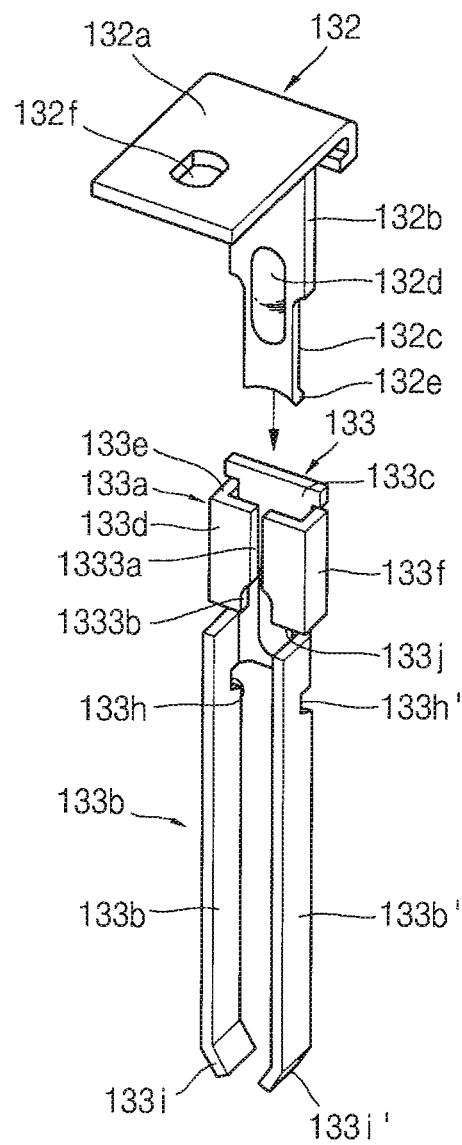
FIG. 4B is a perspective view of the collector of FIG. 4A shown in a disassembled state.

FIG. 4A is a perspective view of the first collector 131' shown in an assembled state; and FIG. 4B is a perspective view showing the first collector 131' of FIG. 4A shown in a disassembled state.

As shown in FIG. 4A, in the first collector 131' according to one embodiment of the present invention, the coupling protrusion part 132b of the first collecting part 132 is coupled to the accommodation part 133a of the second collecting part 133 by sliding the coupling protrusion part 132b into the accommodation part 133a. In one embodiment, as described above with respect to the first collector 131, the protrusion part 132d of the first collecting part 132 is fixed to the protrusion hole 1333b of the second collecting part 133, and the hook part 132e of the first collecting part 132 is fixed to the catch jaw 1332b of the second collecting part 133.

As shown in FIG. 4B, by sliding the first collecting part 132 into the second collecting part 133, the electrode terminal 135 can be connected to the non-coating portions 134a and 134b of both electrode assemblies 110a and 110b. That is, in one embodiment, the first collecting part 132 may be slid into the second collecting part 133 in a manner such that the coupling protrusion part 132b of the first collecting part 132 is coupled to the accommodation part 133a of the second collecting part 133 in a state where the protrusion part 132d and the hook part 132e of the coupling protrusion part 132b are coupled to the protrusion hole 1333b and the catch jaw 1332b of the accommodation part 133a.

FIG. 5A is a perspective view of a first collector 131" of a secondary battery according to another embodiment of the present invention shown in an assembled state; and FIG. 5B is a perspective view of the first collector 131" of FIG. 5A shown in a disassembled state.

As shown in FIG. 5A, in the first collector 131" of a secondary battery according to one embodiment of the present invention, the hook part 132e' of a first collecting part 132 extends from a lower end of a coupling protrusion part 132b and is bent in a direction perpendicular to non-coating portions of electrode assemblies, Therefore, a protrusion part 132d of the first collecting part 132 is fixed to a protrusion hole 1333b of a second collecting part 133, and the hook part 132e' of the first collecting part 132 is fixed to second grooves 133h and 133h of the second collecting part 133.

As shown in FIG. 5B, by sliding the first collecting part 132 into the second collecting part 133, an electrode terminal can be connected to the non-coating portions of the electrode assemblies. That is, in one embodiment, the first collecting part 132 may be slid into the second collecting part 133 in a manner such that the coupling protrusion part 132b of the first collecting part 132 is coupled to the accommodation part 133a of the second collecting part 133 in a state where the protrusion part 132d and the hook part 132e' of the coupling protrusion part 132b are coupled to the protrusion hole 1333b and the second grooves 133h and 133h' of the accommodation part 133a.

Figure 6A:
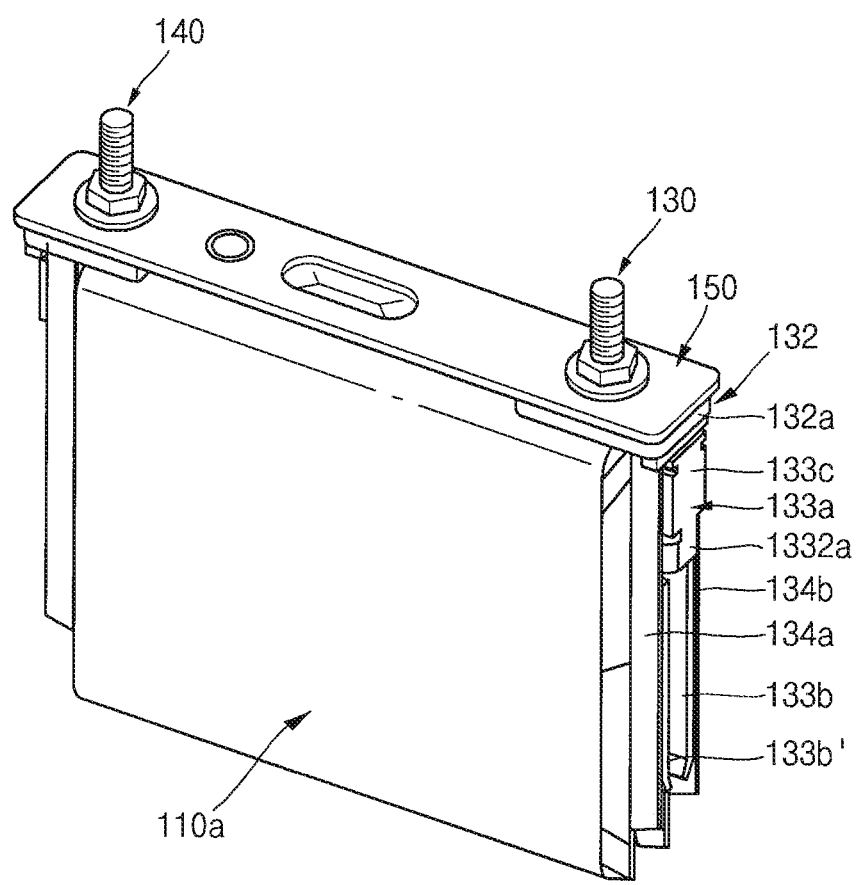
FIG. 6A is a perspective view of collectors and electrode terminals coupled to electrode assemblies of a secondary battery according to an embodiment of the present invention.
Figure 6B:
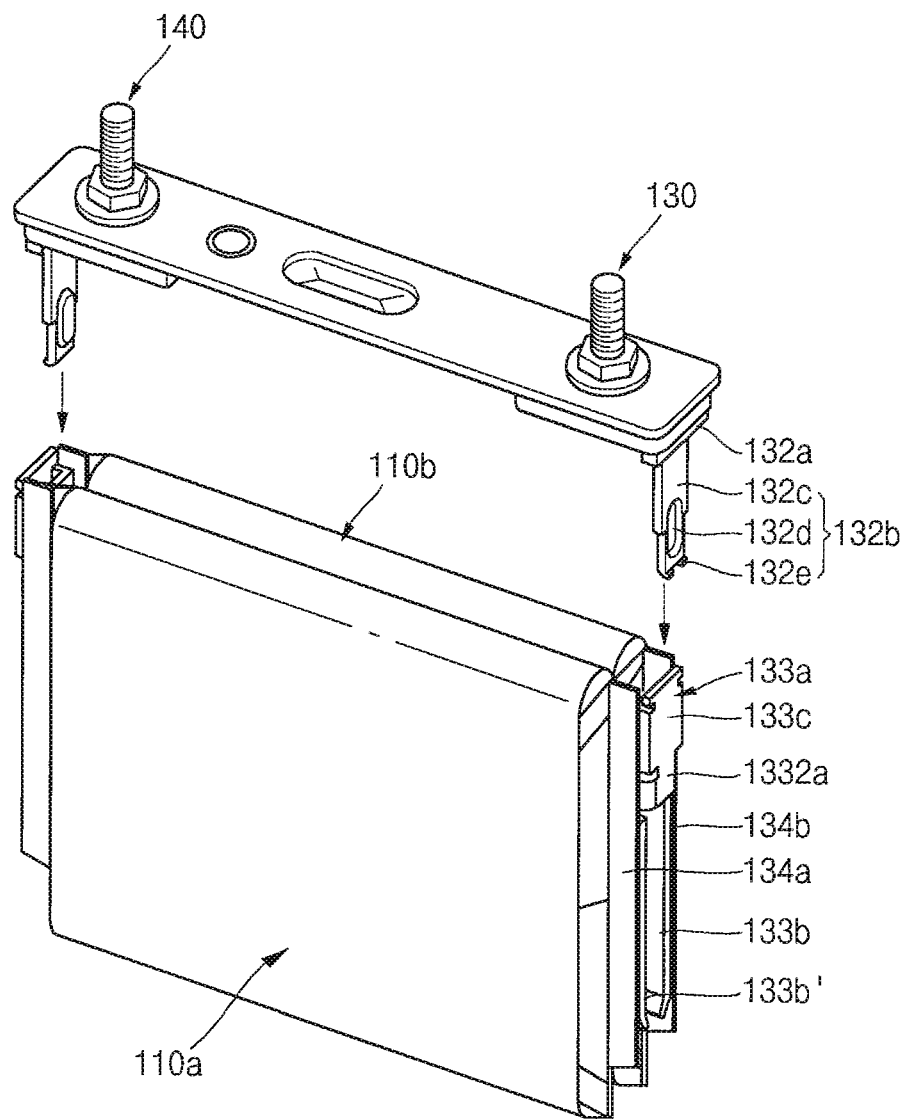
FIG. 6B is a perspective view showing the collectors and electrode terminals uncoupled from the electrode assemblies of FIG. 6A.

FIG. 6A is a perspective view illustrating collectors and electrode terminals coupled to an electrode assembly in a secondary battery according to an embodiment of the present invention; and FIG. 6B is a perspective view showing the collectors and the electrode terminals uncoupled from the electrode assembly of FIG. 6A.

As shown in FIGS. 6A and 6B, in the secondary batteries described above with respect to FIGS. 1 to 5B, the first collecting part 132 connected to the first electrode terminal 135 and the cap plate 150 is slid into and coupled to the second collecting part 133 connected to the non-coating portion 134a, 134b of one or more electrode assemblies 110a, 110b, in a state in which the first and second collecting parts 132 and 133 are respectively fixed to the cap plate 150 and the non-coating portion 134a, 134b of the one or more electrode assemblies 110a, 110b.

Therefore, according to embodiments of the present invention, if the secondary battery has a defective part, the defective part can be easily detached and repaired after disassembling the first collecting part 132 and the second collecting part 133.

As described above, according to embodiments of the present invention, since the secondary battery includes the first and second collectors 131 and 141 having detachable first collecting parts 132 and 142 and second collecting parts 133 and 143, the cap plate 150 can be easily attached without having to couple the collectors 131 and 141 and the terminals 130 and 140 by riveting or welding. Therefore, the manufacturing process of the secondary battery can be improved.

Some exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery comprising:
    an electrode assembly;
    a case containing the electrode assembly;
    a cap plate sealing an opening of the case;
    an electrode terminal protruding outside the case; and
    a collector electrically connected between the electrode assembly and the electrode terminal,
    wherein the collector comprises:
        a first collecting part coupled to the electrode terminal and comprising a first coupling portion; and
        a second collecting part coupled to the electrode assembly and comprising a second coupling portion, the first coupling portion being coupled to the second coupling portion, and
    wherein one of the first and second coupling portions comprises a protrusion part, and the other of the first and second coupling portions comprises an accommodation part, the protrusion part being received in the accommodation part.

2. The secondary battery of claim 1, wherein the first coupling portion comprises the protrusion part, and the second coupling portion comprises the accommodation part.

3. The secondary battery of claim 2, wherein the first collecting part further comprises a head part extending in a direction substantially perpendicular to the protrusion part, the head part being fixed to the electrode terminal and the cap plate.

4. The secondary battery of claim 3, wherein a first width of the protrusion part at a first region distal from the head part is less than a second width of the protrusion part at a second region proximate the head part.

5. The secondary battery of claim 3, wherein the protrusion part comprises a body portion and a hook part extending from the body portion, the hook part being fixed in contact against a surface of the accommodation part.

6. The secondary battery of claim 3, wherein the protrusion part comprises a body portion and a protrusion extending from the body portion, the protrusion being fixed in an opening of the accommodation part.

7. The secondary battery of claim 6, wherein the opening is formed in a wall of the accommodation part, and the wall has a slit formed therethrough adjacent the opening.

8. The secondary battery of claim 1, wherein the second collecting part further comprises a branch part extending from the accommodation part and being fixed to the electrode assembly.

9. The secondary battery of claim 8, wherein the protrusion part comprises a body portion and a hook part extending from the body portion, the hook part being fixed in a groove of the branch part.

10. The secondary battery of claim 8, further comprising another electrode assembly, wherein the second collecting part further comprises another branch part extending from the accommodation part and being fixed to the another electrode assembly.

11. The secondary battery of claim 1, wherein the first coupling portion is detachably coupled to the second coupling portion.

12. The secondary battery of claim 1, wherein the electrode assembly comprises a non-coating portion, and the collector is electrically connected between the non-coating portion and the electrode terminal.

13. The secondary battery of claim 12,
wherein the non-coating portion comprises a first non-coating portion arranged at a first end of the electrode assembly, and the electrode assembly further comprises a second non-coating portion arranged at a second end of the electrode assembly opposite the first end,
wherein the electrode terminal comprises a first electrode terminal, and the collector comprises a first collector, and
wherein the secondary battery further comprises a second electrode terminal protruding outside the case, and a second collector electrically connected between the second non-coating portion and the second electrode terminal.

14. The secondary battery of claim 13, wherein the cap plate and the first and second electrode terminals are detachably coupled to the second collecting parts of the first and second collectors together with the first collecting parts of the first and second collectors.

15. The secondary battery of claim 14, wherein the first collecting parts of the first and second collectors are fixed to the cap plate, and the second collecting parts of the first and second collectors are fixed to the first and second non-coating portions, respectively.

16. A collector for electrically connecting an electrode assembly and an electrode terminal of a secondary battery, the collector comprising:
a first collecting part coupleable to the electrode terminal and including a first coupling portion; and
a second collecting part coupleable to the electrode assembly and including a second coupling portion, the first coupling portion being coupleable to the second coupling portion,
wherein one of the first and second coupling portions comprises a protrusion part, and the other of the first and second coupling portions comprises an accommodation part, the protrusion part being slidably receivable in the accommodation part.

17. The collector of claim 16, wherein the protrusion part comprises a body portion and a hook part extending from the body portion, the hook part being fixed in contact against a surface of the accommodation part.

18. The collector of claim 16, wherein the protrusion part comprises a body portion and a protrusion extending from the body portion, the protrusion being fixed in an opening of the accommodation part.

19. The collector of claim 16, wherein the first coupling portion is detachably coupleable to the second coupling portion.

20. A secondary battery comprising:
an electrode assembly;
a case containing the electrode assembly;
a cap plate sealing an opening of the case;
an electrode terminal protruding outside the case; and
a collector electrically connected between the electrode assembly and the electrode terminal,
wherein the collector comprises:
a first collecting part coupled to the electrode terminal and comprising a first coupling portion; and
a second collecting part coupled to the electrode assembly and comprising a second coupling portion, the first coupling portion being detachably coupled to the second coupling portion, and
wherein one of the first and second coupling portions comprises a protrusion part, and the other of the first and second coupling portions comprises an accommodation part, the protrusion part being slidably receivable in the accommodation part.

* * * * *